United States Patent
Kloos et al.

(10) Patent No.: US 6,451,914 B1
(45) Date of Patent: Sep. 17, 2002

(54) EMULSION POLYTETRAFLUOROETHYLENE MICROPOWDER ADDITIVE FOR FIBER-FORMING PLASTICS

(75) Inventors: Friedrich Kloos, Kastl; Wolfgang Neumann, Kraiburg, both of (DE); Peter Griffiths, Manchester (GB)

(73) Assignee: Dyneon GmbH & Co. KG, Burgkirchen (DE)

( * ) Notice: Subject to any disclaimer, the term of this patent is extended or adjusted under 35 U.S.C. 154(b) by 0 days.

(21) Appl. No.: 09/674,122

(22) PCT Filed: Apr. 26, 1999

(86) PCT No.: PCT/EP99/02806

§ 371 (c)(1),
(2), (4) Date: Oct. 26, 2000

(87) PCT Pub. No.: WO99/57346

PCT Pub. Date: Nov. 11, 1999

(51) Int. Cl.[7] .............................. D01F 1/10; C08L 23/10; C08L 67/02
(52) U.S. Cl. .................... 525/191; 525/199; 525/240
(58) Field of Search ................................ 525/191, 199, 525/240

(56) References Cited

U.S. PATENT DOCUMENTS

| | | | |
|---|---|---|---|
| 2,694,701 A | 11/1954 | Blum et al. | |
| 2,700,661 A | 1/1955 | Miller | |
| 3,067,262 A | 12/1962 | Brady | |
| 3,102,862 A | 9/1963 | Green et al. | |
| 3,103,490 A | 9/1963 | Green | |
| 3,105,824 A | 10/1963 | Green et al. | |
| 3,334,157 A | 8/1967 | Larsen | |
| 3,766,031 A | 10/1973 | Dillon | |
| 3,838,030 A | 9/1974 | Kagiya et al. | |
| 3,956,000 A | 5/1976 | Kuhls et al. | |
| 4,029,870 A | 6/1977 | Brown et al. | 526/255 |
| 4,036,718 A | 7/1977 | Brown et al. | 204/159.2 |
| 4,052,278 A | 10/1977 | Brown et al. | 204/159.2 |
| 4,572,858 A * | 2/1986 | Young | 428/141 |

FOREIGN PATENT DOCUMENTS

| | | |
|---|---|---|
| DE | A-28 22 438 | 5/1978 |
| EP | A-0 113 114 | 12/1983 |
| EP | A-0 780 403 | 12/1996 |
| EP | A-0 822 226 | 2/1998 |
| JP | 07 145511 | 6/1995 |
| WO | WO 97/37828 | 10/1997 |

* cited by examiner

Primary Examiner—Nathan M. Nutter
(74) Attorney, Agent, or Firm—James V. Lilly

(57) ABSTRACT

Compositions, consisting essentially of a melt-spinnable polymer component and minor amounts of an emulsion polytetrafluoroethylene micropowder having a melting point sufficiently far above the processing temperature of the polymer component for the micro-powder not to melt during the processing of the polymer component are suitable for producing textile fiber materials.

10 Claims, No Drawings

EMULSION POLYTETRAFLUOROETHYLENE MICROPOWDER ADDITIVE FOR FIBER-FORMING PLASTICS

DESCRIPTION

This invention relates to a composition consisting essentially of a melt-spinnable polymer component and minor amounts of an emulsion polytetrafluoroethylene (E-PTFE) micropowder having a melting point sufficiently far above the processing temperature of the polymer component for the micropowder not to melt during the processing of the polymer component, to the use of such a composition for producing textile fiber material and to the thusly obtained textile fiber material such as filaments, fibers, yarns or fabrics.

Low molecular weight polytetrafluoroethylene (PTFE) having a molecular weight in the range from $10^4$ to $10^6$ g/mol is known as PTFE micropowders or otherwise waxes. In contrast to high molecular weight PTFE having a molecular weight of up to $10^8$ g/mol, such micropowders have virtually no mechanical strength and can therefore not be used as a material of construction in industry. But they are widely used as additives for improving the friction and the nonstick effect, for example in lubricants or in nonstick polishes, where good demolding properties are required. Micropowders are also used in printing inks, chiefly in high gloss printing. As well as enhanced gloss, this provides smoother surfaces and better glide properties for the printed paper (S.V. Gangal, Encyclopedia of Polymer Science and Engineering, Vol. 16, Tetrafluoroethylene Polymers, pages 597 to 598, John Wiley & Sons, 1989).

In these applications, the particle morphology plays a significant role. It is created by the specific production process. Suitable micropowders can also be produced by γ-ray or electron beam degradation of high molecular weight E-PTFE. Thermal degradation alters the particle morphology, so that such products are unsuitable for the use according to the invention.

The degraded products are ground to particles 3 to 15 μm in size. The micropowders thus prepared are also known as degradation micropowders. Their preparation is described for example in U.S. Pat. No. 3,766,031, U.S. Pat. No. 3,838,030, U.S. Pat. No. 4,029,870, U.S. Pat. No. 4,036,718 and U.S. Pat. No. 4,052,278.

So-called polymerization micropowders are prepared by free-radical polymerization in aqueous emulsion. An emulsion polymerization is a process in which the monomer (or the monomers)—here tetrafluoroethylene (and optionally small fractions of modifying comonomer)—is reacted at relatively high concentrations of fluorinated emulsifiers such as perfluorooctane acid salts with slow stirring to form a colloidal dispersion. The resulting dispersion having a particle size of about 50 to 400 nm, preferably 100 to 300 nm, in diameter, the so-called primary particle, is coagulated and agglomerated to form a secondary particle 2 to 15 μm in diameter.

Polymerization micropowders are more or less easily disintegratable, which is very advantageous for some applications.

The preparation of such micropowders is described for example in U.S. Pat. No. 2,694,701, U.S. Pat. No. 2,700,661, U.S. Pat. No. 3,067,262, U.S. Pat. No. 3,102,862, U.S. Pat. No. 3,103,490, U.S. Pat. No. 3,105,824 and U.S. Pat. No. 3,956,000.

E-PTFE micropowders are highly crystalline, have a melting point of about 300 to 335° C. and a viscosity at 372° C. in the range from $10^1$ to $10^6$ Pas, preferably $10^2$ to $10^5$ Pas.

It has now been found that minor amounts, preferably 0.1 to 10% by weight, especially 0.2 to 5% by weight, in particular 0.5 to 3% by weight, of the micropowders substantially improve the production and properties of fibers and filaments. The invention therefore provides appropriate preparations and further concerns preparations in the form of concentrates ("masterbatches") which include 10 to 30% by weight, preferably 15 to 25% by weight, of PTFE. These concentrates are diluted with the corresponding spin-processable polymer to the use concentration prior to melt spinning. More particularly and surprisingly, the flex abrasion resistance of the fibers is substantially increased and thereby the further processing into textile structures such as yarns and fabrics improved. The thus finished textiles also exhibit better soil repellence. The addition of micropowders also lowers the apparent viscosity of the melt to be spun, permitting a higher throughput and gentler spinning. These advantages are observed in particular in the spinning of polypropylene.

Useful fiber-forming polymer components include all polymers which are customarily processed in a thermoplastic melt-spinning process, for example polyolefins, polyesters or polyamides, and it is known that the melt may include additives such as color pigments, stabilizers or lubricants.

The processing temperature of spinning or fiber production has to be substantially below the melting point of the micropowder added, i.e. the micropowder should not melt even partially in the course of melt spinning. This is simple to judge from the DSC diagram of the micropowder.

As microscopic examinations of fibers produced according to the invention by addition of micropowders show, the micropowder is surprisingly located virtually exclusively on the surface of the fiber, explaining the beneficial effect of the micropowder with regard to spinning and with regard to the further processing properties. In the course of fiber extrusion, the secondary particle is substantially comminuted and forced to the surface of the fiber.

The micropowder added should not significantly fibrillate during spinning, i.e. the particles must not undergo streamlining. This inhibits or suppresses the transport to the fiber surface. Micropowder particle fibrillation can be suppressed by lowering the molecular weight to below $8 \cdot 10^5$ g/mol, which corresponds to a melt viscosity of $10^5$ Pas. Micropowders having this molecular weight are therefore preferred.

The micropowder added should also contain as little as possible of auxiliary chemicals and chemically aggressive end groups from the production process. At the processing temperature these components can degrade the polymer component, for example in the case of polyesters, or chemically alter the usually necessary additives such as stabilizers, dyes or lubricants. PTFE micropowders should in particular be free of carboxyl fluoride COF groups, as generated in the course of radiation degradation in particular. Such products are therefore advantageously aftertreated in known manner. In the case of polymerization micropowders, treatment with ammonia is an advantageous way of generating neutral carboxylamide $CONH_2$ end groups (EP-A-0 780 403).

The PTFE micropowder is essentially a tetrafluoroethylene homopolymer which may also be slightly modified with other comonomers. Useful comonomers include all olefins capable of copolymerizing with tetrafluoroethylene, for example hexafluoropropylene, perfluorooxyalkyl vinyl ethers having alkyl radicals of 1 to 4 carbon atoms, vinylidene fluoride, ethylene or propylene. This "modification" can also be effected by means of vinyl esters and acrylic monomers. The degree of modification should not exceed 0.3 mol %, preferably 0.1 mol %, in order that the chemical character and the physical properties of the PTFE micropowder may be substantially retained and the polymer may not be formable from the melt. The modified micropowder, like the unmodified micropowder, should be chemically inert and at most interact minimally with the components of the spinning melt.

Details of the invention are illustrated in the following examples:

Methods of Measurement

The denier of the filaments/fibers is determined according to DIN-EN-ISO 21973 (in dtex), and the tenacity and elongation are determined according to DIN-EN-ISO 25079 (in cN/tex and %).

The flex abrasion resistance (FAR) of the filaments or fibers is determined on an instrument developed by Hoechst Trevira GmbH & Co KG. The fibers are put under a defined pre-tension of 0.45 cN/dtex and flexed across a VA wire 0.05 mm in thickness at an angle of 110° at a rate of 126 double strokes/min, and the number of flexes to fiber breakage is noted. At least 25 individual samples are measured in order that a statistically valid statement may be ensured. The larger the number of flexes to breakage, the better the flex abrasion resistance of the fibers.

Melt index (MFR): according to ISO 1133 or DIN 53735.

Melting point determination: according to DIN ISO 3146 Method C, DSC (differential scanning calorimetry): Initial weight: about 10 mg; Heating rate: 10 ° C./min; Instrument: Perkin Elmer DSC 4.

Comparative Example A and Inventive Examples 1 to 5

The micropowders used in Inventive Examples 1 to 9 are polymerization micropowders, i.e. prepared by emulsion polymerization.

A commercially available polypropylene having a melt index of 8 g/10 min at 230° C. under a load of 2.16 kg (MFR 230/2) is used on a laboratory spinning unit to produce filaments having a final denier of about 20 dtex at 260° C. To improve the lightstability, 0.25% by weight of a HALS (hindered amine light stabilizer) stabilizer is added as a batch to the polypropylene. The filaments are crimped in a stuffer box, cut to a staple length of 80 mm and measured for flex abrasion resistance (Comparative Example A). The above polypropylene preparation is admixed according to the invention with various amounts of a commercially available E-PTFE micropowder having a melting point of 318° C. and a melt viscosity of $3 \cdot 10^4$ Pas at 372° C. and processed under identical conditions (Inventive Examples 1 to 5). The results are shown in Table 1.

TABLE 1

| Sample | % by wt. of micropowder | Denier dtex | Tenacity cN/tex | Elongation % | FAR |
|---|---|---|---|---|---|
| Comp. Example A | 0 | 20.1 | 12.2 | 660 | 1037 |
| Inv. Example 1 | 0.2 | 20.0 | 12.3 | 630 | 1656 |
| Inv. Example 2 | 0.5 | 20.2 | 12.4 | 640 | 2053 |
| Inv. Example 3 | 1.0 | 22.4 | 12.1 | 645 | 2512 |
| Inv. Example 4 | 2.0 | 21.5 | 12.2 | 615 | 3615 |
| Inv. Example 5 | 3.0 | 21.7 | 11.8 | 645 | 4768 |

As Table 1 shows, the FAR is distinctly increased even by low additions and improved by a factor of 4 to 5 by an addition of 3% by weight.

Comparative Example B and Inventive Examples 6 and 7

A production spinning unit is used to process polypropylene having an MFR 230/2 of 11.3 g/10 min together with 1% by weight of a stabilizer batch and 1% by weight of a color batch into crimped staple fibers having a staple length of 80 mm and a denier of about 15 dtex. The processing temperature is 270° C. (Comparative Example B).

In further runs, the mixture is admixed with a batch consisting of 80% polypropylene and 20% commercially available micropowder having a melting point of 312° C. and a melt viscosity of $6.7 \cdot 10^3$ Pas at 372° C. in such an amount that the concentration of PTFE in the polymer mixture is 1 or 2% by weight, and is processed under identical conditions and measured for FAR. The results are shown in Table 2.

TABLE 2

| Sample | % by weight of micropowder | Denier dtex | FAR |
|---|---|---|---|
| Comp. Example B | 0 | 14.9 | 1873 |
| Inv. Example 6 | 1 | 15.7 | 4782 |
| Inv. Example 7 | 2 | 15.3 | 5899 |

Table 2 demonstrates the improvement in FAR due to addition of a micropowder having a 5 times lower melt viscosity compared with Inventive Examples 1 to 5.

The production of fibers according to Inventive Examples 1 to 7 does not incur any spinning and drawing irregularities, such as, for example, increased spinning breakages, despite the addition of micropowders.

Comparative Example C

Inventive Example 2 is repeated using a commercially available degradative PTFE micropowder obtained by thermo-mechanical degradation of a high molecular weight E-PTFE and having an average particle size of 4.2 μm, a melting point of 310° C. and a melt viscosity of $3.4 \cdot 10^4$ Pas and measuring the FAR. The FAR of Inventive Example 2 is found to be 2053±300 and that of Comparative Example C 1283±1095. Microscopic examinations show that the particles of the degradative micropowder disintegrate only insufficiently during melt spinning and are not sufficiently quantitatively forced out of the fiber to the surface of the fiber. This makes the large variation for the observed FAR plausible.

Comparative Example D and Inventive Examples 8 and 9

A laboratory spinning unit is used to spin a commercially available polyethylene terephthalate (PET) having a solution viscosity of 0.66 dl/g, measured in dichloroacetic acid at a concentration of 1% by weight, and ground to an average particle size $d_{50}$=4.7 μm at 280° C. into filaments which are then further processed in a second operation into texturized yarns having a filament denier of 3.4 dtex. In further runs, the PET is homogeneously admixed with 1 or 2% by weight of a micropowder having a $d_{50}$ of 3.5 μm, a melting point of 319° C. and a melt viscosity of $6 \cdot 10^3$ Pas, and this mixture is spun under the same processing conditions and the FAR measured.

TABLE 3

| Sample | % of PTFE | FAR |
| --- | --- | --- |
| Comp. Example D | 0 | 1719 |
| Inv. Example 8 | 1 | 2620 |
| Inv. Example 9 | 2 | 4221 |

Comparative Example E

The experiment per Inventive Example 8 is repeated, except that the PET is admixed with 0.5% by weight of a high molecular weight PTFE emulsion polymer, ground to 5.0 μm, instead of the micropowder. Even this small addition causes the spinning process to deteriorate in an unacceptable manner. High molecular weight emulsion polymers are evidently unsuitable for this application.

What is claimed is:

1. A textile fiber composition consisting essentially of
   (i) a major amount of a melt-spinnable polymer component,
   (ii) a minor amount of a low molecular weight emulsion polymerized polytetrafluoroethylene component having a melting point sufficiently above that of the melt-spinnable polymer component that the polytetrafluoroethylene does not melt during processing of the melt-spinnable polymer component, and
   (iii) optionally additives selected from the group consisting of pigments, stabilizers and lubricants,
   wherein the low molecular weight polytetrafluoroethylene is other than a degraded polytetrafluoroethylene micropowder.

2. A composition according to claim 1 wherein the low molecular weight polytetrafluoroethylene has a molecular weight in the range of from $10^4$ to $10^6$ g/mol.

3. A composition according to claim 2 wherein the low molecular weight polytetrafluoroethylene comprises from 0.1 to 30% by weight of the melt-spinnable polymer component.

4. A composition according to claim 1 wherein the low molecular weight polytetrafluoroethylene comprises from 0.1 to 10% by weight of the melt-spinnable polymer component.

5. A composition according to claim 1 wherein the low molecular weight polytetrafluoroethylene comprises from 10 to 30% by weight of the melt-spinnable polymer component.

6. A composition according to claim 1 wherein the low molecular weight polytetrafluoroethylene component comprises a homopolymer of tetrafluoroethylene, or a copolymer of tetrafluoroethylene with up to 0.3 mol % of a comonomer copolymerizable with tetrafluoroethylene.

7. A composition according to claim 6 wherein the comonomer capable of copolymerizing with tetrafluoroethylene is selected from the group consisting of hexafluoropropylene, a perfluorooxyalkyl vinyl ether having from 1 to 4 carbon atoms in the alkyl radical, vinylidene fluoride, ethylene, propylene, vinyl esters and acrylic monomers.

8. A textile fiber composition comprising
   (i) a major amount of a melt-spinnable polymer component,
   (ii) from 0.1 to 30% by weight based on the weight of the melt-spinnable polymer component of a polytetrafluoroethylene micropowder having a molecular weight of from $10^4$ to $10^6$ g/mol wherein the polytetrafluoroethylene micropowder (a) has a melting point above the processing temperature of the melt-spinnable polymer component so that the low molecular weight polytetrafluoroethylene remains solid at the processing temperature, (b) has not been prepared by a degradative process, and (c) does not degrade the melt-spinnable polymer component at the processing temperature thereof,
   (iii) optionally additives selected from the group consisting of pigments, stabilizers and lubricants.

9. A fiber of the composition of claim 1.

10. A fiber according to claim 9 wherein the low molecular weight polytetrafluoroethylene is substantially at the surface of the fiber.

* * * * *